United States Patent Office

3,843,499
Patented Oct. 22, 1974

3,843,499
PRODUCTION OF 4-ENDOTRICYCLO(5,2,1,0$^{2,6\text{-ENDO}}$) DECYLAMINE
Bernd Giese, Heidelberg, and Peter Jaeger, Horst Koenig, and Karl Siegfried Brenner, Ludwigshafen, Germany, assignors to Badische Anilin- & Soda-Fabrik Aktiengesellschaft, Ludwigshafen (Rhine), Germany
No Drawing. Filed Feb. 12, 1973, Ser. No. 331,560
Int. Cl. C07b 29/06; C07c 87/40
U.S. Cl. 204—74                                                7 Claims

ABSTRACT OF THE DISCLOSURE

Production of sterically uniform 4 - endo - tricyclo-(5,2,1,0$^{2,6\text{-endo}}$)-decylamine. In the process of the compound

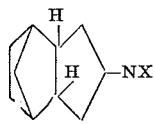

in which X is H, OH or OCOR and R is alkyl of one to four carbon atoms is reduced catalytically or electrochemically at the interface between the liquid and a metal or metal alloy.

---

The present invention relates to a process for the production of 4-endotricyclo(5,2,1,0$^{2,6\text{-endo}}$)-decylamine which is sterically uniform.

It is known that 4-endotricyclo(5,2,1,0$^{2,6\text{-endo}}$)-decylamine (formula (I)):

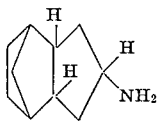

(I)

(hereinafter referred to as 4-endotricyclodecylamine) can be recovered in a fairly low yield by repeated troublesome and time-consuming recrystallization of the amine mixture obtained from the Ritter reaction of hydrocyanic acid with dihydrodicyclopentadiene, which mixture is sterically nonuniform as regards the amino group on carbon atom 4 and which has been converted into salt form.

We have now found a process for the production of sterically uniform 4-endotricyclodecylamine in which a compound of the formula (II):

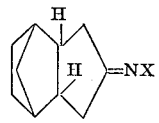

(II)

in which X is H, OH or OCOR and R is lower alkyl of one to four carbon atoms is reduced by heterogeneous catalytic hydrogenation at a platinum metal or electrochemically. A heterogeneous course of the reaction at the surface of a metal is characteristic of the stereospecific reduction according to the invention.

In one embodiment the reduction of a compound of formula (II) by heterogeneous catalytic hydrogenation is preferably carried out in contact with a platinum metal in a solvent.

Platinum metal is a particularly advantageous catalyst used in finely divided form, if desired on carbon as a carrier material, or as platinum sponge. It is particularly advantageous to use the platinum in the form of platinum dioxide.

The reduction may be carried out in contact with other platinum metals such as palladium, ruthenium or rhodium but platinum metal is the most effective catalyst in terms of yield and steric uniformity. Mixtures of platinum metals or platinum metal alloys may also be used.

The hydrogenation conditions are the conditions conventionally used in heterogeneous catalytic hydrogenations. The conventional hydrogen pressures may be used. For the sake of simplicity in apparatus however it is preferred to use atmospheric pressure.

The solvents may be those conveniently used for catalytic hydrogenations such as ethers, for example diethyl ether, tetrahydrofuran or dioxane; alcohols such as methanol, ethanol, n-propanol or isopropanol; carboxylic acids, particularly acetic acid; or carboxylic anhydrides, particularly acetic anhydride. Mixtures of solvents or mixtures of solvents with water and if desired inorganic acids such as aqueous alcohols especially methanol or ethanol with an addition of a small amount of aqueous hydrochloric acid or sulfuric acid may also be used. Methanol, ethanol and acetic anhydride are particularly preferred solvents.

The temperature range used may be the whole range within which the solvent or solvent mixture used is in liquid phase. It is preferred to use room temperature.

The hydrogenation product is processed conventionally. It may conveniently be distilled at subatmospheric pressure.

It is preferred to use the oxime or oxime acetate of formula (II) with X being OH or OCOCH$_3$ for the heterogeneous catalytic hydrogenation in contact with platinum.

In this embodiment the endo-tricyclodecylamine is obtained in good to very good yields in a uniformity of at least 98%.

It is surprising that a more or less completely uniform product is obtained in contact with platinum metals having regard to the steric position of the amino group on carbon atom 4. Where a uniformity of at least 98% is found by gas chromatographic analysis the deviation lies within the limits of error of the analytical method.

Although amines are obtained in fairly high yields with other conventional hydrogenation catalysts of group 8 of the Periodic Table of Elements, such as Raney nickel, the two isomeric amines are obtained in almost equal proportions. Reduction in homogeneous phase, for example with the soluble complex (Py)$_3$Rh(BH$_4$)Cl$_2$, also results in a mixture of isomers.

In the other embodiment which similarly and surprisingly results in sterically uniform-4-endotricyclodecylamine the reduction of a compound of the formula (II) is carried out as a cathodic reduction.

Liquid mercury is particularly advantageous as the cathode material. When the use of a dimensionally stable electrode is desired, solid amalgams such as lead amalgam or the amalgams of other metals such as silver amalgam may be used.

If desired another electrode material having a high hydrogen overvoltage, for example lead, may be used. The current efficiencies are however often somewhat lower than with the abovementioned cathode materials.

The conditions correspond to the conditions conventionally used in cathodic reduction processes.

For example the use of a diaphragm to separate the cathode chamber from the anode chamber is convenient to ensure good yields and current efficiencies and trouble-free sustained operation at moderate cell potentials. The diaphragm may be of a porous layer of clay, some other porous metal and particularly advantageously an iron exchanger.

The upper temperature limit for this reduction method is about 40° C. because more byproducts are formed at higher temperatures. This results in a decrease in the yield. The minimum temperature for electrochemical reduction is about −20° C. because below this temperature the lower solubility of the starting material and the increasing ohmic resistance of the solution make it difficult to carry out the reduction. It is preferred to use the range from 0° to 30° C.

Any liquid which adequately dissolves a compound of the formula (II), which does not react in an undesired manner with the substances present, which is stable under the conditions of the electrolysis and which ensures an adequate conductivity of the solution may be used as the solvent. The solvent should also be easy to separate in processing. Lower alcohols, if desired mixed with water or an ether, are particularly advantageous for the above reasons.

Preferred solvents are methanol, ethanol, n-propanol and isopropanol mixed with water. Dioxane and tetrahydrofuran mixed with water and if desired lower alcohols have proved to be suitable. The concentration of the starting compound to be reduced should conveniently be as high as possible. The content by weight is as a rule not below 1%. It is particularly favorable to choose a concentration only slightly below the saturation limit.

A suspension of the compound of formula (II) may also be used if desired. The dissolved portion is reduced, the 4-endotricyclodecylamine remains in solution as a salt and because of the mixing of the electrolysis solution more starting material is continuously dissolved. In this way the process may be carried out for the whole period near to the saturation concentration.

The current density has only a very slight influence on the yield and the stereoselectivity of the reduction. To achieve a favorable current efficiency with advantageous dimensions of cell and heat exchanger, a current density of from 1 to 20 amperes/dm.$^2$ is preferably used.

The pressure is not decisive for the process and it is therefore preferred to use atmospheric pressure. It is convenient to use an inert gas atmosphere. For example the solution may be flushed with nitrogen during the reduction.

The conducting electrolyte may be any substance which is adequately ionized in the solution at a pH of about 5 or less and which does not disturb the electrolysis, as for example an inorganic acid such as sulfuric acid, phosphoric acid or a salt such as lithium chloride in combination with an acid in order to set up a pH of less than 5.

The product is worked up in a conventional way, for example by extensive distillation of the solvent, adjusting the residue to an alkaline pH, extracting with an organic solvent such as ether, benzene or other water-immiscible solvent and fractional distillation of the dried organic phase.

In a particularly convenient embodiment the cathodic reduction is carried out continuously.

In a preferred continuous method of operation the use of a cascade arrangement of a plurality of cells in which the first cell is operated at a higher current density than the following cell or cells is particularly favorable.

The oxime is preferably used for cathodic reduction.

The starting compound of formula (II) may be obtained conventionally from the 4-keto compound on which the compound is based by reaction with ammonia or hydroxylamine or for example by oxidation of a sterically nonuniform mixture of 4-tricyclodecylamine to the oxime followed if desired by reaction for example with a derivative of acetic acid or propionic acid to the oxime ester. The reduction according to the invention into the sterically uniform 4-endotricyclodecylamine is then carried out.

Sterically uniform 4-endotricyclodecylamine is a valuable chemical intermediate and particularly pharmaceutical intermediate. The compound has particular significance as an amine component of arylsulfonylureas having the effect of lowering blood sugar and of plant protection agents.

The following examples serve to illustrate the process of the invention.

EXAMPLE 1

5.0 g. of oxime (formula (II) with X equal to OH) is dissolved in 100 g. of methanol and after an addition of 0.2 g. of platinum dioxide hydrogenation is carried on at 25° C. with hydrogen at atmospheric pressure until the theoretical amount thereof has been absorbed. The catalyst is filtered off and the methanol is distilled off. 3.4 g. of 4-endotricyclodecylamine passes over at 111° to 113° C. at 17 mm. The steric uniformity, determined by gas chromatographic analysis, is at least 98%.

EXAMPLE 2

5.5 g. of oxime acetate (formula (II) with X equal to $$O-\underset{\underset{O}{\|}}{C}-CH_3)$$

is dissolved in 100 g. of acetic anhydride and 0.2 g. of platinum dioxide is added. Hydrogenation is carried on at 25° C. with hydrogen at atmospheric pressure until the theoretical amount has been absorbed.

The catalyst is filtered off and acetic anhydride is distilled off at subatmospheric pressure. The residue is heated under reflux with alcoholic caustic potash solution for eight hours, slightly acidified, concentrated and the aqueous phase is made alkaline with caustic potash solution and extracted with ether. 2.8 g. of 4-endotricyclodecylamine (whose uniformity determined gas chromatographically is at least 98%) passes over at 111° to 113° C. at 17 mm.

EXAMPLE 3

An electrolytic cell consists of a cylindrical glass tube having a capacity of 600 ml., a surface ground edge and a surface ground cover, which is provided with ground inlets for the reception of current leads, cooling coils, thermometer and the like. Platinum gauze is placed in the middle of the cell and this is separated from the rest of the cell by a porous hollow clay cylinder closed at the bottom as a diaphragm. A pool of mercury having an area of about 0.6 dm.$^2$ at the bottom of the glass tube serves as cathode and is contacted by a platinum wire fused into a glass tube. A solution of 10.0 g. of oxime (formula (II) with X equal to OH), 285 g. of methanol and 40 g. of sulfuric acid (96 to 98%, D=1.84) is placed in the cell. The clay cylinder forming the anode chamber is filled with an about 10% aqueous sulfuric acid. During thirteen hours a current of 1.0 ampere is passed through the solution (catholyte current density 1.67 amps/dm.$^2$). During this period nitrogen is added above the solution as protective gas and the temperature in the electrolyte is kept at 10° C. A magnetic stirrer is used to provide efficient mixing.

After the reaction is over the solution is extensively evaporated in vacuo, caustic soda solution is added until there is a strongly alkaline reaction and extraction with ether is carried out. After drying with sodium sulfate the residue of the ether phase is fractionally distilled. 8.10 g. of 4-endotricyclodecylamine passes over at 111° to 113° C. at 17 mm. The uniformity determined gas chromatographically is at least 98%.

EXAMPLE 4

The process of Example 3 is repeated but a disc of lead amalgam having a surface area of 0.6 dm.$^2$ is used as the cathode.

The yield is 4.95 g. of 4-endotricyclodecylamine having a uniformity of at least 98%.

EXAMPLE 5

Electrolysis is carried on for seven hours at 8 amperes (8 amps/dm.$^2$) in an electrolytic plant consisting of a continuous flow cell having a mercury cathode, ion exchanger membrane as diaphragm and platinized titanium anode as well as a buffer vessel, heat exchanger, pump and means for continuous metering in of a methanol solution of oxime (formula (II) with X equal to OH) and of sulfuric acid; a solution of 50 g. of oxime, 1270 g. of methanol and 160 g. of sulfuric acid (D=1.84) is supplied. Then further methanolic solution of oxime and sulfuric acid is supplied continuously. To equalize the liquid the electrolyte may leave through an overflow.

The ratio of metered in oxime, sulfuric acid and the amount of current supplied remain constant. After 168 hours the electrolysis is stopped, the electrolyte is collected and worked up.

A yield of 980 g. of 4-endotricyclodecylamine is obtained with an input of 1360 g. of oxime.

We claim:

1. A process for the production of sterically uniform 4-endotricyclo(5,2,1,0$^{2,6-endo}$) - decylamine which comprises:

electrochemically reducing a compound of the formula

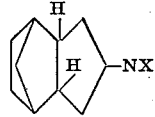

wherein X is hydrogen, hydroxy or —OCOR in which R is lower alkyl of 1 to 4 carbon atoms, said reduction being carried out in a liquid solvent selected from the group consisting of an organic solvent and an aqueous organic solvent reaction medium at a mercury, lead or amalgam electrode at a current density of about 1 to 20 amps/dm.$^2$ at a temperature of from —20° C. to 40° C. and a pH of about 5 or less; and separating the substantially sterically uniform amine product from the reaction medium.

2. A process as claimed in Claim 1 wherein X in the compound being reduced is hydroxy.

3. A process as claimed in Claim 1 wherein X in the compound being reduced is —OCOCH$_3$.

4. A process as claimed in Claim 1 wherein the cathodic reduction is carried out at a temperature of 0° C. to 30° C.

5. A process as claimed in Claim 1 wherein the liquid reaction medium is an aqueous mixture of an organic solvent selected from the class consisting of lower alkanols, dioxane, tetrahydrofuran and mixtures thereof.

6. A process as claimed in Claim 1 wherein the cathodic reduction is carried out continuously.

7. A process as claimed in Claim 6 wherein X in the compound being reduced is hydroxy.

References Cited

UNITED STATES PATENTS

| 2,375,611 | 5/1945 | Barber et al. | 204—74 X |
| 3,410,769 | 11/1968 | Baiger | 204—74 |

FOREIGN PATENTS

| 141,346 | 1/1902 | Germany | 204—74 |

FREDERICK C. EDMUNDSON, Primary Examiner

U.S. Cl. X.R.

260—563 R

UNITED STATES PATENT OFFICE
CERTIFICATE OF CORRECTION

Patent No. 3,843,499            Dated October 22, 1974

Inventor(s) Bernd Giese et al

It is certified that error appears in the above-identified patent and that said Letters Patent are hereby corrected as shown below:

IN THE HEADING, insert

-- Claims priority, Germany, February 22, 1972, P 22 08 155.6 --

Signed and Sealed this

Twentieth Day of July 1976

[SEAL]

Attest:

RUTH C. MASON
*Attesting Officer*

C. MARSHALL DANN
*Commissioner of Patents and Trademarks*